US010205236B2

(12) United States Patent
Ma et al.

(10) Patent No.: US 10,205,236 B2
(45) Date of Patent: Feb. 12, 2019

(54) ANTENNA SYSTEM

(71) Applicant: HUAWEI TECHNOLOGIES CO., LTD., Shenzhen (CN)

(72) Inventors: Xiaohui Ma, Xi'an (CN); Jianping Zhao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 26 days.

(21) Appl. No.: 15/349,380

(22) Filed: Nov. 11, 2016

(65) Prior Publication Data
US 2017/0062927 A1 Mar. 2, 2017

Related U.S. Application Data

(63) Continuation of application No. PCT/CN2014/077277, filed on May 12, 2014.

(51) Int. Cl.
H01Q 3/28 (2006.01)
H01Q 3/36 (2006.01)
(Continued)

(52) U.S. Cl.
CPC .............. *H01Q 3/36* (2013.01); *H01Q 1/241* (2013.01); *H01Q 1/48* (2013.01); *H01Q 3/28* (2013.01);
(Continued)

(58) Field of Classification Search
CPC ............ H01Q 1/241; H01Q 1/48; H01Q 3/36; H01Q 21/061; H01Q 21/22; H01Q 25/001; H01Q 25/002; H01Q 3/28
See application file for complete search history.

(56) References Cited

U.S. PATENT DOCUMENTS 5,166,690 A * 11/1992 Carlson ................... G01S 7/034
342/157
5,414,434 A * 5/1995 Conant ..................... H01Q 1/28
343/700 MS
(Continued)

FOREIGN PATENT DOCUMENTS

CN 1575530 A 2/2005
CN 1653841 8/2005
(Continued)

OTHER PUBLICATIONS

International Search Report, dated Feb. 13, 2015, in International Application No. PCT/CN2014/077277 (4 pp.).
(Continued)

*Primary Examiner* — Tho G Phan
(74) *Attorney, Agent, or Firm* — Staas & Halsey LLP

(57) ABSTRACT

The present invention discloses an antenna system, where the antenna system includes an antenna module, configured to: receive and/or transmit at least one first radio frequency signal, and at least one second radio frequency signal; a power-split phase-shift network module, configured to control an amplitude and a phase of each radio frequency signal in the antenna module, where control parameters for controlling an amplitude and a phase of each first radio frequency signal are configured according to a beam pointing direction and a beam width that are required by a three-dimensional building region, and control parameters for controlling an amplitude and a phase of each second radio frequency signal are configured according to a beam pointing direction and a beam width that are required by a ground region. Therefore, a problem of high costs and difficulty in obtaining an antenna site and maintaining an antenna is resolved.

10 Claims, 11 Drawing Sheets

(51) Int. Cl.
*H01Q 21/22* (2006.01)
*H04W 16/28* (2009.01)
*H01Q 1/24* (2006.01)
*H01Q 1/48* (2006.01)
*H01Q 25/00* (2006.01)
*H01Q 21/06* (2006.01)

(52) U.S. Cl.
CPC .......... *H01Q 21/22* (2013.01); *H01Q 25/001* (2013.01); *H01Q 25/002* (2013.01); *H04W 16/28* (2013.01); *H01Q 21/061* (2013.01)

(56) References Cited

U.S. PATENT DOCUMENTS

| | | | | |
|---|---|---|---|---|
| 6,268,828 | B1 * | 7/2001 | Martek | H01Q 3/242 342/373 |
| 8,237,619 | B2 * | 8/2012 | Vassilakis | H01Q 3/40 343/836 |
| 8,466,848 | B2 * | 6/2013 | Guy | H01Q 3/2676 343/853 |
| 8,508,427 | B2 * | 8/2013 | Deng | H01Q 3/16 343/839 |
| 2004/0178862 | A1 | 9/2004 | Kaplan et al. | |
| 2004/0209572 | A1 | 10/2004 | Thomas | |
| 2005/0213527 | A1 | 9/2005 | Xie | |
| 2009/0009392 | A1 | 1/2009 | Jacomb-Hood et al. | |

FOREIGN PATENT DOCUMENTS

| | | |
|---|---|---|
| CN | 201378631 Y | 1/2010 |
| CN | 102412886 | 4/2012 |
| CN | 103026552 | 4/2013 |
| CN | 103633452 A | 3/2014 |
| EP | 3067988 B1 | 4/2018 |
| WO | 2012159281 A1 | 11/2012 |

OTHER PUBLICATIONS

Extended European Search Report, dated May 4, 2017, in European Application No. 14892153.9 (9 pp.).

International Search Report dated Feb. 13, 2015 in corresponding International Application No. PCT/CN2014/077277.

Chinese Office Action dated Aug. 10, 2018 in corresponding Chinese Patent Application No. 201480007946.9, 10 pgs.

* cited by examiner

ANTENNA SYSTEM

CROSS-REFERENCE TO RELATED APPLICATIONS

This application is a continuation of International Application No. PCT/CN2014/077277, filed on May 12, 2014, the disclosure of which is hereby incorporated by reference in its entirety.

TECHNICAL FIELD

The present invention relates to the field of communications technologies, and in particular, to an antenna system.

BACKGROUND

With popularity of intelligent terminals, rich services of the intelligent terminals encourage the booming development of MBB (mobile broadband). With the increasingly diversified and complex network environment, a region that an antenna covers changes dynamically in a diversified communications network. Generally, a beam of an antenna needs to widely cover a ground. When the beam needs to cover a specific three-dimensional building, the beam of the antenna needs to have a three-dimensional feature to meet this need.

In the prior art, different antennas are used to implement basic coverage, key ground coverage, and three-dimensional building coverage respectively. The basic coverage is implemented by using an antenna with a relatively high gain, so that a relatively large area can be covered and continuous networking can be performed. The key ground coverage is mainly designed for deployment of some hotspot devices that need a relatively small coverage area. The three-dimensional building coverage is implemented by using an indoor distribution system or an outdoor antenna close to a three-dimensional building.

It can be learned that multiple antennas need to be deployed to meet coverage for different regions, so as to implement 3-dimensional coverage in a mobile communications environment. Therefore, a great many antennas need to be set, and because a great many antennas need to be set, there is a problem of relatively high costs and relatively big difficulty in obtaining an antenna site and maintaining an antenna in the existing solution.

SUMMARY

The present invention provides an antenna system, so as to resolve a problem of relatively high costs and relatively big difficulty in obtaining an antenna site and maintaining an antenna caused by setting a great many antennas in the prior art.

According to a first aspect, the present invention provides an antenna system, including:

an antenna module, configured to receive and/or transmit at least one first radio frequency signal, and receive and/or transmit at least one second radio frequency signal; and a power-split phase-shift network module, configured to control an amplitude and a phase of each radio frequency signal in the antenna module, where control parameters for controlling an amplitude and a phase of each first radio frequency signal are configured according to a beam pointing direction and a beam width that are required by a three-dimensional building region, and control parameters for controlling an amplitude and a phase of each second radio frequency signal are configured according to a beam pointing direction and a beam width that are required by a ground region.

With reference to the first aspect, in a first possible implementation manner, the antenna system further includes:

a radio frequency transceiving module, configured to provide, after processing a baseband signal to obtain a third radio frequency signal and a fourth radio frequency signal, the third radio frequency signal and the fourth radio frequency signal for the power-split phase-shift network module, and process the at least one first radio frequency signal and the at least one second radio frequency signal received from the power-split phase-shift network module, to obtain the baseband signal.

With reference to the first possible implementation manner of the first aspect, in a second possible implementation manner, the antenna module includes a first array and a second array;

M first radio frequency signals function on $M_1 * N_1$ elements in the first array, to form an uptilt beam covering the three-dimensional building region, where a value of M corresponds to a quantity of elements included in the first array, $M_1$ represents a quantity of horizontal elements in the first array, $N_1$ represents a quantity of vertical elements in the first array, M and $M_1$ are positive integers, and $N_1$ is an integer greater than 1; and N second radio frequency signals function on $M_2 * N_2$ elements in the second array, to form a downtilt beam covering the ground region, where a value of N corresponds to a quantity of elements included in the second array, $M_2$ represents a quantity of horizontal elements in the second array, $N_2$ represents a quantity of vertical elements in the second array, N and $M_2$ are positive integers, and $N_2$ is an integer greater than 1.

With reference to the second possible implementation manner of the first aspect, in a third possible implementation manner, the power-split phase-shift network module includes:

a first uptilt power-split phase-shift network module, configured to perform power splitting and phase change on the third radio frequency signal, so as to split the third radio frequency signal into the M first radio frequency signals; and a second downtilt power-split phase-shift network module, configured to perform power splitting and phase change on the fourth radio frequency signal, so as to split the fourth radio frequency signal into the N second radio frequency signals.

With reference to the first possible implementation manner of the first aspect, in a fourth possible implementation manner, the antenna module includes a third array, a fourth array, and a shared array;

P first radio frequency signals function on $M_3 * N_3$ elements in the third array, to form a first uptilt sub-beam, where a value of P corresponds to a quantity of elements included in the third array, $M_3$ represents a quantity of horizontal elements in the third array, $N_3$ represents a quantity of vertical elements in the third array, P and $M_3$ are positive integers, and $N_3$ is an integer greater than 1;

Q second radio frequency signals function on $M_4 * N_4$ elements in the fourth array, to form a first downtilt sub-beam, where a value of Q corresponds to a quantity of elements included in the fourth array, $M_4$ represents a quantity of horizontal elements in the fourth array, $N_4$ represents a quantity of vertical elements in the fourth array, Q and $M_4$ are positive integers, and $N_4$ is an integer greater than 1;

K first radio frequency signals and K second radio frequency signals function on $M_5*N_5$ elements in the shared array, to form a second uptilt sub-beam corresponding to the K first radio frequency signals and a second downtilt sub-beam corresponding to the K second radio frequency signals, where a value of K corresponds to a quantity of elements included in the shared array, $M_5$ represents a quantity of horizontal elements in the shared array, $N_5$ represents a quantity of vertical elements in the shared array, K and $M_5$ are positive integers, and $N_5$ is an integer greater than 1; and the first uptilt sub-beam and the second uptilt sub-beam jointly form an uptilt beam covering the three-dimensional building region, and the first downtilt sub-beam and the second downtilt sub-beam jointly form a downtilt beam covering the ground region.

With reference to the fourth possible implementation manner of the first aspect, in a fifth possible implementation manner, the power-split phase-shift network module includes:

a second uptilt power-split phase-shift network module, configured to perform power splitting and phase change on the third radio frequency signal, so as to split the third radio frequency signal into the P first radio frequency signals; and a second downtilt power-split phase-shift network module, configured to perform power splitting and phase change on the fourth radio frequency signal, so as to split the fourth radio frequency signal into the Q second radio frequency signals; and an uptilt-downtilt power-split phase-shift network module, configured to: perform power splitting and phase change on the third radio frequency signal, so as to split the third radio frequency signal into the K first radio frequency signals; and perform power splitting and phase change on the fourth radio frequency signal, so as to split the fourth radio frequency signal into the K second radio frequency signal.

With reference to the fifth possible implementation manner of the first aspect, in a sixth possible implementation manner, the uptilt-downtilt power-split phase-shift network module includes one or more bridges, and each bridge is configured to perform split and combination processing on the third radio frequency signal and the fourth radio frequency signal, and perform power splitting on a radio frequency signal obtained after the split and combination processing.

With reference to the third possible implementation manner of the first aspect, in a seventh possible implementation manner, the first uptilt power-split phase-shift network module includes at least one phase shifter and at least one power splitter, and the second downtilt power-split phase-shift network module includes at least one phase shifter and at least one power splitter, where each phase shifter is connected to each power splitter, each power splitter is configured to perform power splitting on a radio frequency signal that passes through the power splitter, and each phase shifter is configured to perform phase shift on a radio frequency signal that passes through the phase shifter, a power-split ratio of each power splitter and a phase-shift angle of each phase shifter are configured according to the three-dimensional building region or the ground region that a beam needs to cover.

With reference to the fifth possible implementation manner of the first aspect, in an eighth possible implementation manner, the second uptilt power-split phase-shift network module includes at least one phase shifter and at least one power splitter, and the second downtilt power-split phase-shift network module includes at least one phase shifter and at least one power splitter, where each phase shifter is connected to each power splitter, each power splitter is configured to perform power splitting on a radio frequency signal that passes through the power splitter, and each phase shifter is configured to perform phase shift on a radio frequency signal that passes through the phase shifter, a power-split ratio of each power splitter and a phase-shift angle of each phase shifter are configured according to a beam pointing direction and a beam width.

With reference to any possible implementation manner of the first aspect to the eighth possible implementation manner of the first aspect, in a ninth possible implementation manner, an element included in the antenna module is a single-polarized element or a dual-polarized element.

It can be learned from the foregoing technical solution that the technical solution provided in the present invention at least brings the following technical effects:

An antenna module included in the antenna system according to embodiments of the present invention receives and/or transmits at least one first radio frequency signal, and receives and/or transmits at least one second radio frequency signal; a power-split phase-shift network module controls an amplitude and a phase of each radio frequency signal in the antenna module, where control parameters for controlling an amplitude and a phase of each first radio frequency signal are configured according to a beam pointing direction and a beam width that are required by a three-dimensional building region, and control parameters for controlling an amplitude and a phase of each second radio frequency signal are configured according to a beam pointing direction and a beam width that are required by a ground region. It can be learned that the power-split phase-shift network module changes an amplitude and a phase of a radio frequency signal, so that radiation of the first radio frequency signal can have a specific upward pointing direction and a specific width, thereby covering the three-dimensional building region, and radiation of the second radio frequency signal can have a specific downward pointing direction and a specific width, thereby covering the ground region. There is no need to deploy multiple antennas in the antenna system disclosed in the present invention, and only one deployed antenna is able to implement 3-dimensional coverage of a given region including the three-dimensional building region and the ground region. Therefore, costs of the antenna system are reduced, and the antenna system is easier to deploy and maintain the antenna system.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 6B-1 and FIG. 6B-2 are diagrams of a beam direction of a beam formed according to Embodiment 4 of the present invention;

DESCRIPTION OF EMBODIMENTS

Embodiments of the present invention provide an antenna system, so as to reduce costs of the antenna system and make the antenna system easier to deploy and maintain.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
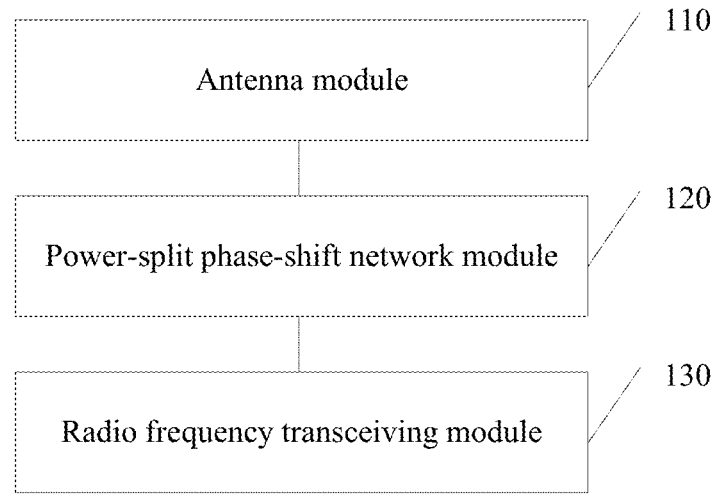
FIG. 1 is a functional block diagram of an antenna system according to an embodiment of the present invention.

Referring to FIG. 1, FIG. 1 is a functional block diagram of an antenna system according to an embodiment of the present invention. The antenna system includes the following structures: an antenna module 110, a power-split phase-shift network module 120, and a radio frequency transceiving module 130.

The antenna module 110 is configured to: receive and/or transmit at least one first radio frequency signal, and receive and/or transmit at least one second radio frequency signal.

The power-split phase-shift network module 120 is configured to control an amplitude and a phase of each radio frequency signal in the antenna module 110, where control parameters for controlling an amplitude and a phase of each first radio frequency signal are configured according to a beam pointing direction and a beam width that are required by a three-dimensional building region, and control parameters for controlling an amplitude and a phase of each second radio frequency signal are configured according to a beam pointing direction and a beam width that are required by a ground region.

The radio frequency transceiving module 130 is configured to: provide, after processing a baseband signal to obtain a third radio frequency signal and a fourth radio frequency signal, the third radio frequency signal and the fourth radio frequency signal for the power-split phase-shift network module 120, and process the at least one first radio frequency signal and the at least one second radio frequency signal received from the power-split phase-shift network module 120, to obtain the baseband signal.

The following separately describes the modules.

1. The Antenna Module 110

Figure 2:
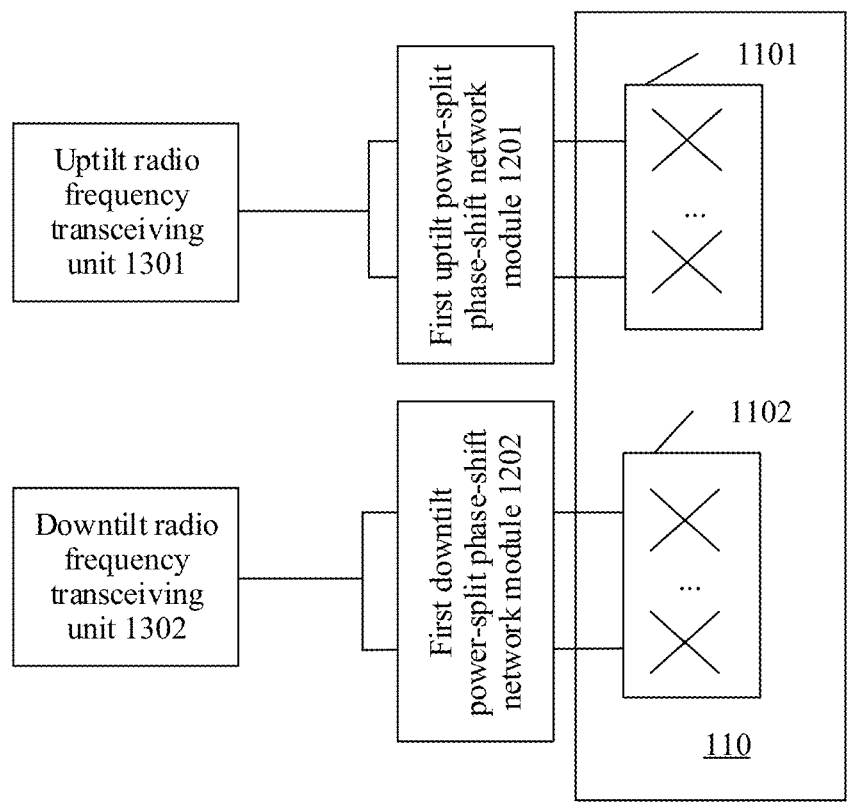
FIG. 2 is a schematic structural diagram of an A-type preferred antenna system according to an embodiment of the present invention.

Specifically, referring to FIG. 2, in an A-type preferred antenna system, the antenna module 110 includes: a first array 1101 and a second array 1102.

The first array 1101 obtains M first radio frequency signals. The M first radio frequency signals function on $M_1*N_1$ elements in the first array 1101, to form an uptilt beam covering the three-dimensional building region. A value of M corresponds to a quantity of elements included in the first array 1101, $M_1$ represents a quantity of horizontal elements in the first array 1101, $N_1$ represents a quantity of vertical elements in the first array 1101, M and $M_1$ are positive integers, and $N_1$ is an integer greater than 1.

The second array 1102 obtains N second radio frequency signals. The N second radio frequency signals function on $M_2*N_2$ elements in the second array 1102, to form a downtilt beam covering the ground region. A value of N corresponds to a quantity of elements included in the second array 1102, $M_2$ represents a quantity of horizontal elements in the second array 1102, $N_2$ represents a quantity of vertical elements in the second array 1102, N and $M_2$ are positive integers, and $N_2$ is an integer greater than 1.

For example, the first array 1101 includes 1*4 elements, and the second array 1102 includes 1*2 elements. When the elements are single-polarized, a value of M is 4, which indicates that power splitting is performed on a first radio frequency signal to form four first radio frequency signals that are connected to four corresponding elements in the first array 1101; and a value of N is 1, which indicates that power splitting is performed on a second radio frequency signal to form two second radio frequency signals that are connected to two corresponding elements in the second array 1102. When the elements are dual-polarized, a value of M is 8, which indicates that power splitting is performed on a first radio frequency signal to form eight first radio frequency signals that are connected to four corresponding elements in the first array 1101; and a value of N is 2, which indicates that power splitting is performed on a second radio frequency signal to form four second radio frequency signals that are connected to two corresponding elements in the second array 1102.

Figure 3:
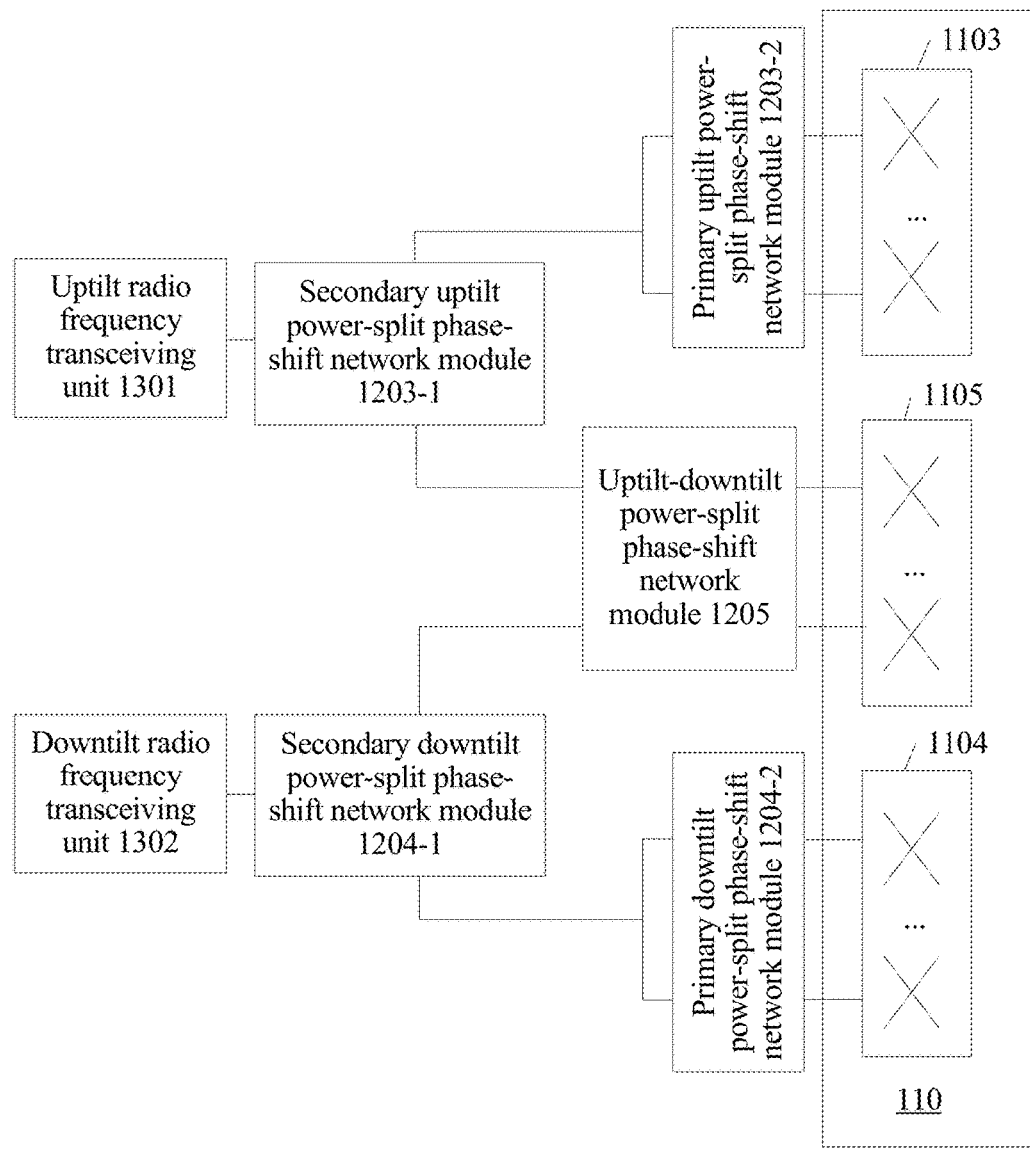
FIG. 3 is a schematic structural diagram of a B-type preferred antenna system according to an embodiment of the present invention.

Specifically, referring to FIG. 3, the antenna module 110 in a B-type preferred antenna system includes: a third array 1103, a fourth array 1104, and a shared array 1105.

The third array 1103 obtains P first radio frequency signals. The P first radio frequency signals function on $M_3*N_3$ elements in the third array 1103, to form a first uptilt sub-beam. A value of P corresponds to a quantity of elements included in the third array 1103, $M_3$ represents a quantity of horizontal elements in the third array 1103, $N_3$ represents a quantity of vertical elements in the third array 1103, P and $M_3$ are positive integers, and $N_3$ is an integer greater than 1.

The fourth array 1104 is configured to obtain Q second radio frequency signals. The Q second radio frequency signals function on $M_4*N_4$ elements in the fourth array 1104, to form a first downtilt sub-beam. A value of Q corresponds to a quantity of elements included in the fourth array 1104, $M_4$ represents a quantity of horizontal elements in the fourth array 1104, $N_4$ represents a quantity of vertical elements in the fourth array 1104, Q and $M_4$ are positive integers, and $N_4$ is an integer greater than 1.

The shared array 1105 can obtain K first radio frequency signals and K second radio frequency signals. The K first radio frequency signals and the K second radio frequency signals function on $M_5*N_5$ elements in the shared array 1105, to form a second uptilt sub-beam corresponding to the K first radio frequency signals and a second downtilt sub-beam corresponding to the K second radio frequency signals. A value of K corresponds to a quantity of elements included in the shared array 1105, $M_5$ represents a quantity of horizontal elements in the shared array 1105, $N_5$ represents a quantity of vertical elements in the shared array 1105, K and $M_5$ are positive integers, and $N_5$ is an integer greater than 1.

The first uptilt sub-beam and the second uptilt sub-beam jointly form an uptilt beam covering the three-dimensional building region, and the first downtilt sub-beam and the second downtilt sub-beam jointly form a downtilt beam covering the ground region.

In a specific implementation process, a manner of setting values of P, Q, and K is the same as or similar to a manner of setting values of M and N, and is not described herein by using an example. Because the shared array 1105 is set, when the three-dimensional building region and the ground region that need to be covered are the same, the values of P and Q are less than the values of M and N.

The following describes structures of the arrays in the antenna module 110 in detail.

For example, the shared array 1105 includes $M_5 * N_5$ elements, where $M_5 \geq 1$, and $N_5 > 1$, which indicates that a quantity of horizontal elements may be one, a quantity of vertical elements is at least two. The quantity of vertical elements and the quantity of horizontal elements may be the same or different. In a specific implementation process, array structures of the foregoing first array 1101, the third array 1103, the second array 1102, and the fourth array 1104 are the same as or similar to an array structure of the shared array 1105 described, and details are not described herein again for brevity of the specification. It can be learned that setting multiple elements in a vertical direction can help control 3-dimensional coverage of a region that is covered in the vertical direction.

Specifically, in both the A-type preferred antenna system and the B-type preferred antenna system, elements that form an array in the antenna module 110 may be dual-polarized elements or single-polarized elements. The array group formed by the elements may be a single column array or a multiple column array, and a quantity of vertical elements and a quantity of horizontal elements in the array may be the same or different, which are not limited in this embodiment of the present invention.

2. The Power-split Phase-shift Network Module 120

Specifically, continue to refer to FIG. 2. In the A-type preferred antenna system, the power-split phase-shift network module 120 includes a first uptilt power-split phase-shift network module 1201 and a first downtilt power-split phase-shift network module 1202. The first uptilt power-split phase-shift network module 1201 is configured to perform power splitting and phase change on the third radio frequency signal, so as to split the third radio frequency signal into the M first radio frequency signals. The first downtilt power-split phase-shift network module 1202 is configured to perform power splitting and phase change on the fourth radio frequency signal, so as to split the fourth radio frequency signal into the N second radio frequency signals.

Referring to FIG. 3, to reduce a volume and a weight of an antenna module, using a shared antenna element can reduce a quantity of elements used in the entire antenna module. Therefore, some of antenna elements in the antenna module 110 may be used as shared antenna elements to form the shared array 1105 (for which reference is made to the foregoing detailed description of the shared array 1105). The shared array 1105 generates a beam pointing to an upward direction as well as a beam pointing to a downward direction.

Furthermore, because the shared antenna elements are used, the power-split phase-shift network module 120 in the B-type preferred antenna system includes: a second uptilt power-split phase-shift network module 1203, configured to perform power splitting and phase change on the third radio frequency signal, so as to split the third radio frequency signal into the P first radio frequency signals; a second downtilt power-split phase-shift network module 1204, configured to perform power splitting and phase change on the fourth radio frequency signal, so as to split the fourth radio frequency signal into the Q second radio frequency signals; and an uptilt-downtilt power-split phase-shift network module 1205, configured to: perform power splitting and phase change on the third radio frequency signal, so as to split the third radio frequency signal into the K first radio frequency signals, and perform power splitting and phase change on the fourth radio frequency signal, so as to split the fourth radio frequency signal into the K second radio frequency signals.

In a specific implementation process, the third radio frequency signal obtained by the uptilt-downtilt power-split phase-shift network module 1205 may be a third radio frequency signal directly generated by the radio frequency transceiving module 130, or may be a radio frequency signal obtained after a power splitter in the second uptilt power-split phase-shift network module 1203 performs power splitting at least once. Likewise, the fourth radio frequency signal obtained by the uptilt-downtilt power-split phase-shift network module 1205 may be a fourth radio frequency signal directly generated by the radio frequency transceiving module 130, or may be a radio frequency signal obtained after a power splitter in the second downtilt power-split phase-shift module 1204 performs power splitting at least once.

When the third radio frequency signal and the fourth radio frequency signal obtained by the uptilt-downtilt power-split phase-shift network module 1205 are the radio frequency signals obtained after the power splitters perform power splitting at least once, the antenna system is shown in FIG. 3. The second uptilt power-split phase-shift network module 1203 is specifically described as a secondary uptilt power-split phase-shift network module 1203-1 and a primary uptilt power-split phase-shift network module 1203-2. The secondary uptilt power-split phase-shift network module 1203-1 and the primary uptilt power-split phase-shift network module 1203-2 jointly complete a power splitting and phase change process. The second downtilt power-split phase-shift network module 1204 is specifically described as a secondary downtilt power-split phase-shift network module 1204-1 and a primary downtilt power-split phase-shift network module 1204-2. The secondary downtilt power-split phase-shift network module 1204-1 and the primary downtilt power-split phase-shift network module 1204-2 jointly complete a power splitting and phase change process. Continue to refer to FIG. 3. The third radio frequency signal obtained by the uptilt-downtilt power-split phase-shift network module 1205 is the radio frequency signal obtained after the secondary uptilt power-split phase-shift network module 1203-1 performs power splitting at least once, and the fourth radio frequency signal obtained by the uptilt-downtilt power-split phase-shift network module 1205 is the radio frequency signal obtained after the secondary downtilt power-split phase-shift network module 1204-1 performs power splitting at least once.

For example, the uptilt-downtilt power-split phase-shift network module 1205 includes one or more bridges. Each bridge is configured to perform split and combination processing on the third radio frequency signal and the fourth radio frequency signal, and perform power splitting on a radio frequency signal obtained after the split and combination processing. In a specific implementation process, different quantities of shared elements in the configured shared array 1105 lead to different components included in the uptilt-downtilt power-split phase-shift network module 1205. For example, if the shared array 1105 includes two elements, the uptilt-downtilt power-split phase-shift network module 1205 may use only one 3 dB bridge, and two input ends of the 3 dB bridge respectively obtain a third radio frequency signal and a fourth radio frequency signal. A signal generated after split and combination processing is performed on the third radio frequency signal and the fourth radio frequency signal is split into two radio frequency signals with an equal amplitude and a phase difference of 90 degrees. Two output ends of the 3 dB bridge are connected to two shared elements, and therefore, a pair of the shared elements obtains the two radio frequency signals with an equal amplitude and a phase difference of 90 degrees, and radiates the two radio frequency signals outward. If the shared array 1105 includes more than two elements, and four elements are used as an example, an output end of each 3 dB bridge may be connected to a power splitter, and an output end of the power splitter is connected to a phase shifter. In this case, four radio frequency signals with different phases are obtained by means of power splitting. Certainly, another connection manner may also be used, for example, a connection manner described in the subsequent Embodiment 4, and it is not limited to one implementation manner in a specific implementation process. Certainly, in a specific implementation process, the uptilt-downtilt power-split phase-shift network module 1205 may also be implemented by using a power splitter of another type instead of a bridge. Therefore, it is not limited to using a bridge.

Specifically, the first uptilt power-split phase-shift network module 1201 in the A-type preferred antenna system includes at least one phase shifter and at least one power splitter, and the first downtilt power-split phase-shift network module 1202 includes at least one phase shifter and at least one power splitter. Each phase shifter is connected to each power splitter, each power splitter is configured to perform power splitting on a radio frequency signal that passes through the power splitter, and each phase shifter is configured to perform phase shift on a radio frequency signal that passes through the phase shifter. A power-split ratio of each power splitter and a phase-shift angle of each phase shifter are configured according to a three-dimensional building region or a ground region that a beam needs to cover.

The second uptilt power-split phase-shift network module 1203 in the B-type preferred antenna system includes at least one phase shifter and at least one power splitter, and the second downtilt power-split phase-shift network module 1204 includes at least one phase shifter and at least one power splitter. Each phase shifter is connected to each power splitter, each power splitter is configured to perform power splitting on a radio frequency signal that passes through the power splitter, and each phase shifter is configured to perform phase shift on a radio frequency signal that passes through the phase shifter. A power-split ratio of each power splitter and a phase-shift angle of each phase shifter are configured according to a beam pointing direction and a beam width.

The B-type preferred antenna system is used as an example. The shared array 1105 includes an array of two elements, and the second uptilt power-split phase-shift network module 1203 includes a power splitter, configured to split a third radio frequency signal into two radio frequency signals. For example, one phase shifter may be set and perform phase shift on a radio frequency signal obtained after power splitting; or two phase shifters may be set to be connected to two output ends of the power splitter respectively, and respectively perform phase shift on two radio frequency signals obtained after power splitting. Certainly, in a specific implementation process, another connection relationship between a power splitter and a phase shifter based on a same invention conception may be used, which is not limited herein. The second downtilt power-split phase-shift network module 1204 may also be implemented in a same manner, and details are not described herein again for brevity of the specification.

In a specific implementation process, a type of a power splitter used in the technical solution in the present invention is not limited. For example, one or a combination of more of power splitting components such as a 1-to-2 power splitter, a 1-to-3 power splitter, and a 3 dB bridge may be used, and is specifically selected according to a power splitting requirement. For ease of description, all power splitters used in this embodiment of the present invention refer to one-to-two power splitters, but are not used to limit the present invention.

3. The Radio Frequency Transceiving Module 130

In a specific implementation process, referring to FIG. 2 or FIG. 3, in the A-type preferred antenna system or the B-type preferred antenna system, the radio frequency transceiving module 130 may include an uptilt radio frequency transceiving unit 1301 and a downtilt radio frequency transceiving unit 1302, where the uptilt radio frequency transceiving unit 1301 corresponds to radio frequency signal transmitting and radio frequency signal receiving in the three-dimensional building region, and the downtilt radio frequency transceiving unit 1302 corresponds to radio frequency signal transmitting and radio frequency signal receiving in the ground region.

It can be learned from the foregoing description of the modules that, the two preferred antenna systems disclosed in the present invention may finally form an uptilt beam covering a three-dimensional building region, and a downtilt beam covering a ground region. Specifically, after power splitting and phase shift are performed on a third radio frequency signal, at least one first radio frequency signal is formed, and a beam formed after the at least one first radio frequency signal functions on an uptilt beam array (which is the first array 1101 in the A-type preferred antenna system, and the third array 1103 and the shared array 1105 in the B-type preferred antenna system) has a specific beam width and a specific upward direction, and radiates the three-dimensional building region that needs to be covered. After power splitting and phase shift are performed on a fourth radio frequency signal, at least one second radio frequency signal is formed, and a beam formed after the at least one second radio frequency signal functions on a downtilt beam array (which is the second array 1102 in the A-type preferred antenna system, and the fourth array 1104 and the shared array 1105 in the B-type preferred antenna system) has a specific beam width and a specific downward direction, and radiates the ground region that needs to be covered.

The following describes a B-type preferred antenna system according to an embodiment of the present invention by using an example and with reference to FIG. 4, FIG. 5A to FIG. 5C, FIG. 6A, FIG. 6B-1 and FIG. 6B-2.

Embodiment 1

In this embodiment, elements in three array groups, a third array 1103, a fourth array 1104, and a shared array 1105 that are in an antenna module 110, are all dual-polarized elements, and all the three array groups consist of 1*2 elements. Element spacings between the elements in the three array groups are the same and are a 0.6 wavelength.

Because the elements in the three array groups are all dual-polarized elements, two second uptilt power-split phase-shift network modules 1203 are set to be connected to the third array 1103, two uptilt-downtilt power-split phase-shift network modules 1205 are set to be connected to the shared array 1105, and two second downtilt power-split phase-shift network modules 1204 are set to be connected to the fourth array 1104.

In this embodiment, a radio frequency transceiving module 130 includes a transceiver Trx1 configured to generate a third radio frequency signal, and a transceiver Trx2 configured to generate a fourth radio frequency signal. Both the transceiver Trx1 and the transceiver Trx2 have two cross polarization ports (a principal polarization port and a negative polarization port).

The two uptilt-downtilt power-split phase-shift network modules 1205 are a 3 dB bridge $K_1$ and a 3 dB bridge $K_2$. In a second uptilt power-split phase-shift network module 1203 connected to the principal polarization port of the Trx1, a secondary uptilt power-split phase-shift network module 1203-1 includes a power splitter $A_1$ with a power-split ratio of 1:1, and a phase shifter $C_1$ with a phase-shift angle of 180 degrees; and a primary uptilt power-split phase-shift network module 1203-2 includes a power splitter $B_1$ with a power-split ratio of 1:4, and a phase shifter $D_1$ with a phase-shift angle of 90 degrees, where the input end of the power splitter $A_1$ is connected to the transceiver Trx1.

In a second downtilt power-split phase-shift network module 1204 connected to the principal polarization port of the Trx2, a secondary downtilt power-split phase-shift network module 1204-1 includes a power splitter $G_1$ with a power-split ratio of 1:1, and the phase shifter $C_1$ with a phase-shift angle of 180 degrees; and a primary downtilt power-split phase-shift network module 1204-2 includes a power splitter $H_1$ with a power-split ratio of 1:4, and the phase shifter $D_1$ with a phase-shift angle of 90 degrees. A second uptilt power-split phase-shift network module connected to the negative polarization port of the Trx1 has a same structure as the foregoing second uptilt power-split phase-shift network module 1203 connected to the principal polarization port of the Trx1. A second downtilt power-split phase-shift network module connected to the negative polarization port of the Trx2 has a same structure as the foregoing second downtilt power-split phase-shift network module 1204 connected to the principal polarization port of the Trx2. Details are not described herein again for brevity of the specification, and reference may be made to FIG. 4.

Figure 5A:
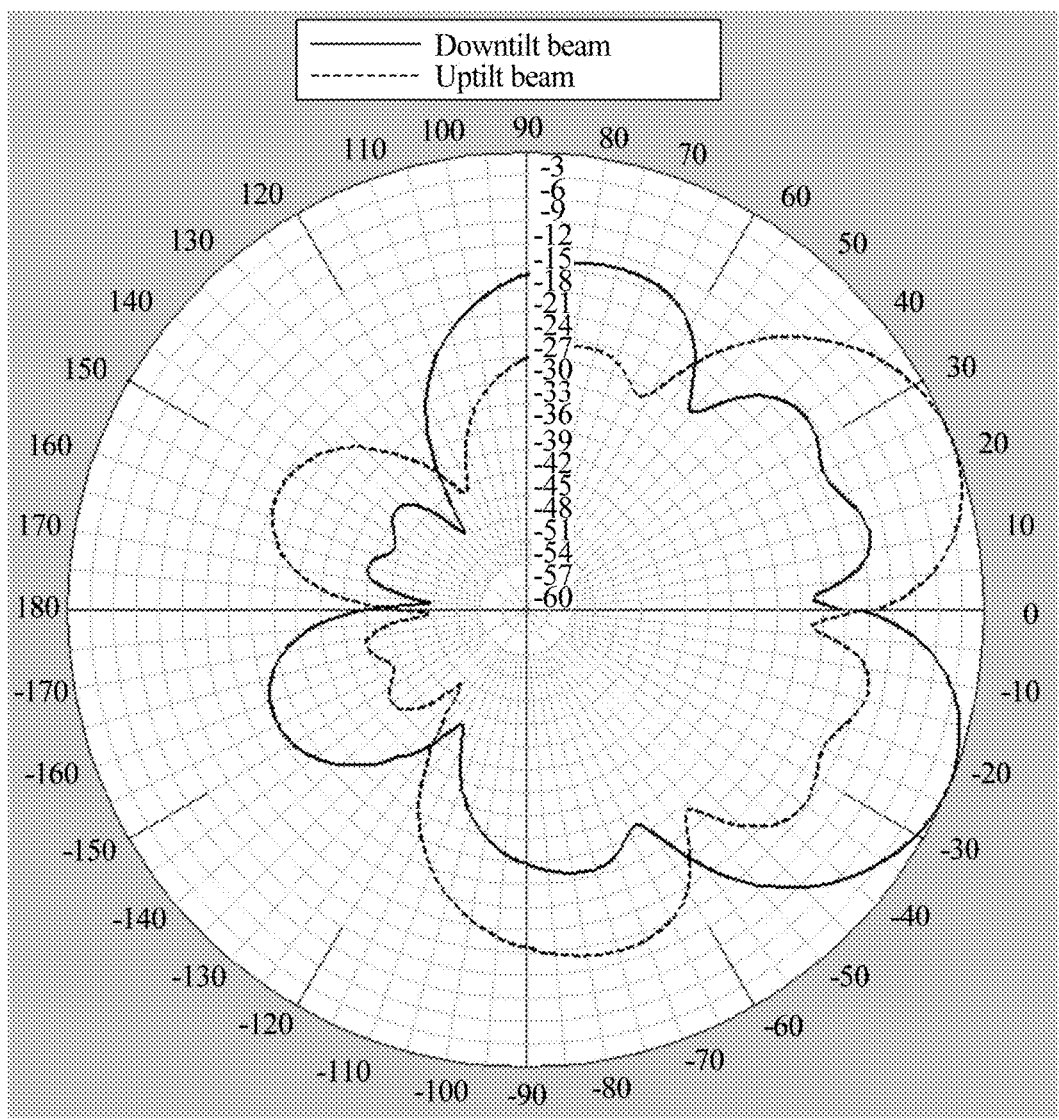
FIG. 5A is a diagram of a beam direction of a beam formed according to Embodiment 1 of the present invention.

Directions of an uptilt beam and a downtilt beam that are finally formed according to an antenna system in Embodiment 1 are shown in FIG. 5A. The formed uptilt beam has a vertical beam width of 25 degrees, a gain of 13.60 dBi, and an uptilt of 23 degrees, and can be responsible for covering a three-dimensional building region. The formed downtilt beam has a vertical beam width of 25 degrees, a gain of 13.60 dBi, and a downtilt of 23 degrees, and can be responsible for covering a ground region. In Embodiment 1, both interference on a main lobe of the downtilt beam caused by the uptilt beam and interference on a main lobe of the uptilt beam caused by the downtilt beam can be controlled at around 14 dB, and an overlap between the uptilt beam and the downtilt beam is about 15 dB.

Embodiment 2

Figure 4:
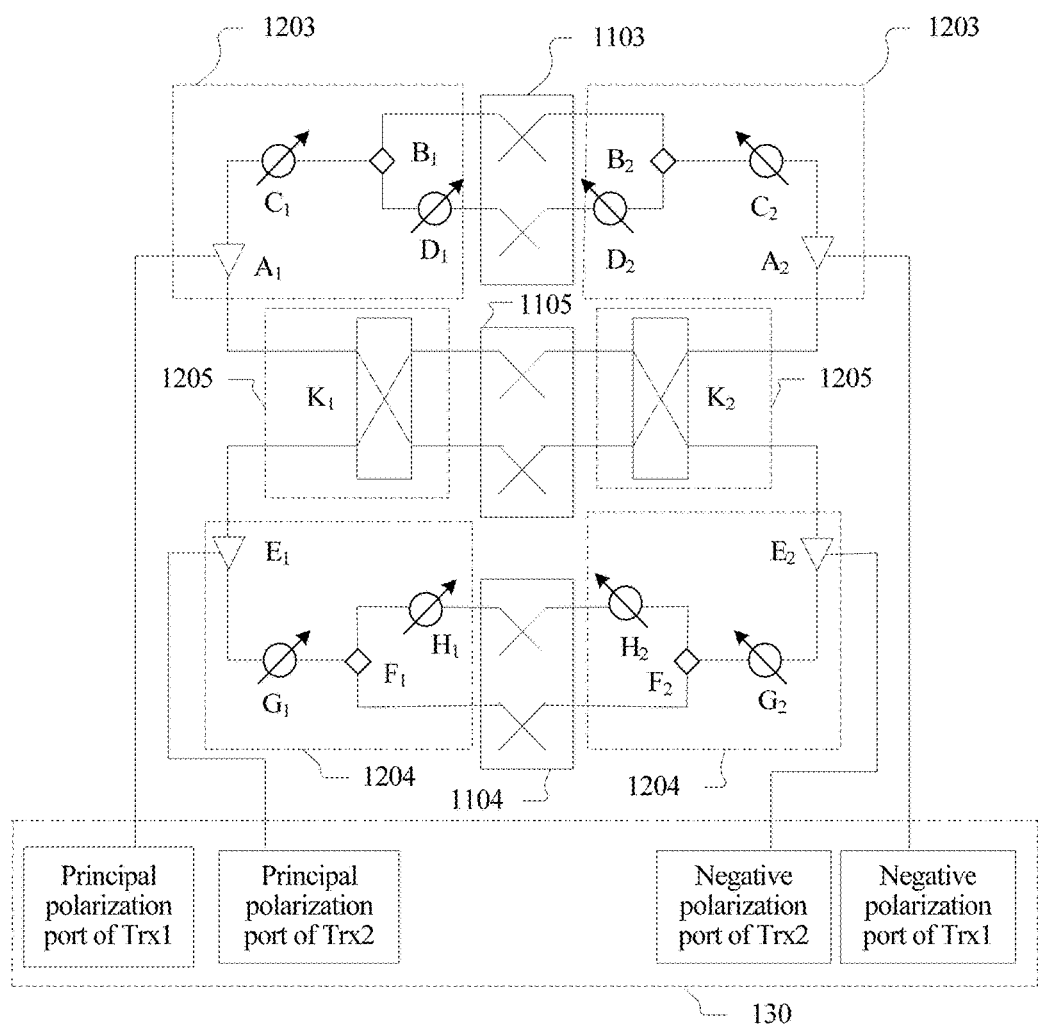
FIG. 4 is a diagram of an entity structure of a B-type preferred antenna system in an implementation manner according to an embodiment of the present invention.

For a structural diagram of an antenna system in Embodiment 2, reference is still made to FIG. 4. However, compared with the foregoing Embodiment 1, some component parameters in Embodiment 2 are different from those in Embodiment 1. A specific difference is that power-split ratios of all power splitters $B_1$, $B_2$, $F_1$, and $F_2$ are 1:5, and phase-shift angles of all phase shifters C1, C2, G1, and G2 are 195 degrees. For other parameters, reference is made to the description in Embodiment 1.

Figure 5B:
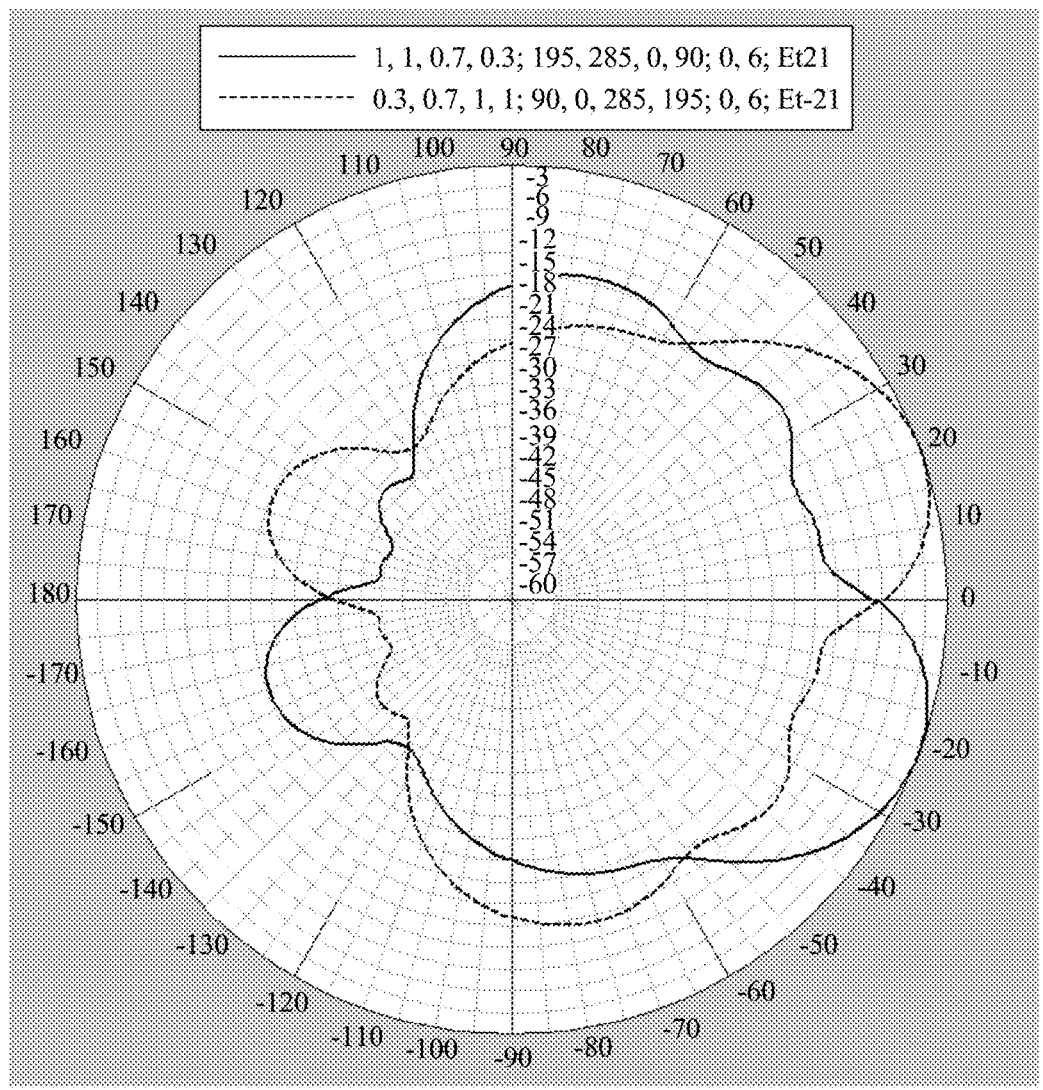
FIG. 5B is a diagram of a beam direction of a beam formed according to Embodiment 2 of the present invention.

An uptilt beam and a downtilt beam that are finally formed according to the antenna system in Embodiment 2 are shown in FIG. 5B. The uptilt beam has a vertical beam width of 26 degrees, a gain of 13.12 dBi, and an uptilt of 21 degrees, and can be responsible for covering a three-dimensional building region. The downtilt beam has a vertical beam width of 26 degrees, a gain of 13.12 dBi, and a downtilt of 21 degrees, and can be responsible for covering a ground region. In Embodiment 2, both interference on a main lobe of the downtilt beam caused by the uptilt beam and interference on a main lobe of the uptilt beam caused by the downtilt beam can be controlled at around 15.8 dB, and an overlap between the uptilt beam and the downtilt beam is about 12 dB. Compared with Embodiment 1, it can be learned that, a beam width and a beam angle of a beam finally formed in an antenna can be changed by changing a power-split ratio of a power splitter and a phase-shift angle of a phase shifter that are in an antenna system. Consequently, controlling a size and a position of a region that can be covered by the antenna in a three-dimensional manner is implemented; an overlap region between the uptilt beam and the downtilt beam is smaller; and there is relatively low suppression caused by the two beams on the main lobe of the peer beam, which better facilitates interference controlling.

Embodiment 3

For a structural diagram of an antenna system in Embodiment 3, reference is still made to FIG. 4. However, compared with the foregoing Embodiment 1, some settings in Embodiment 3 are different from those in Embodiment 1. A specific difference is that a shared array 1105 is a 0.5 wavelength. For other parameters, reference is made to the description in Embodiment 1.

Figure 5C:
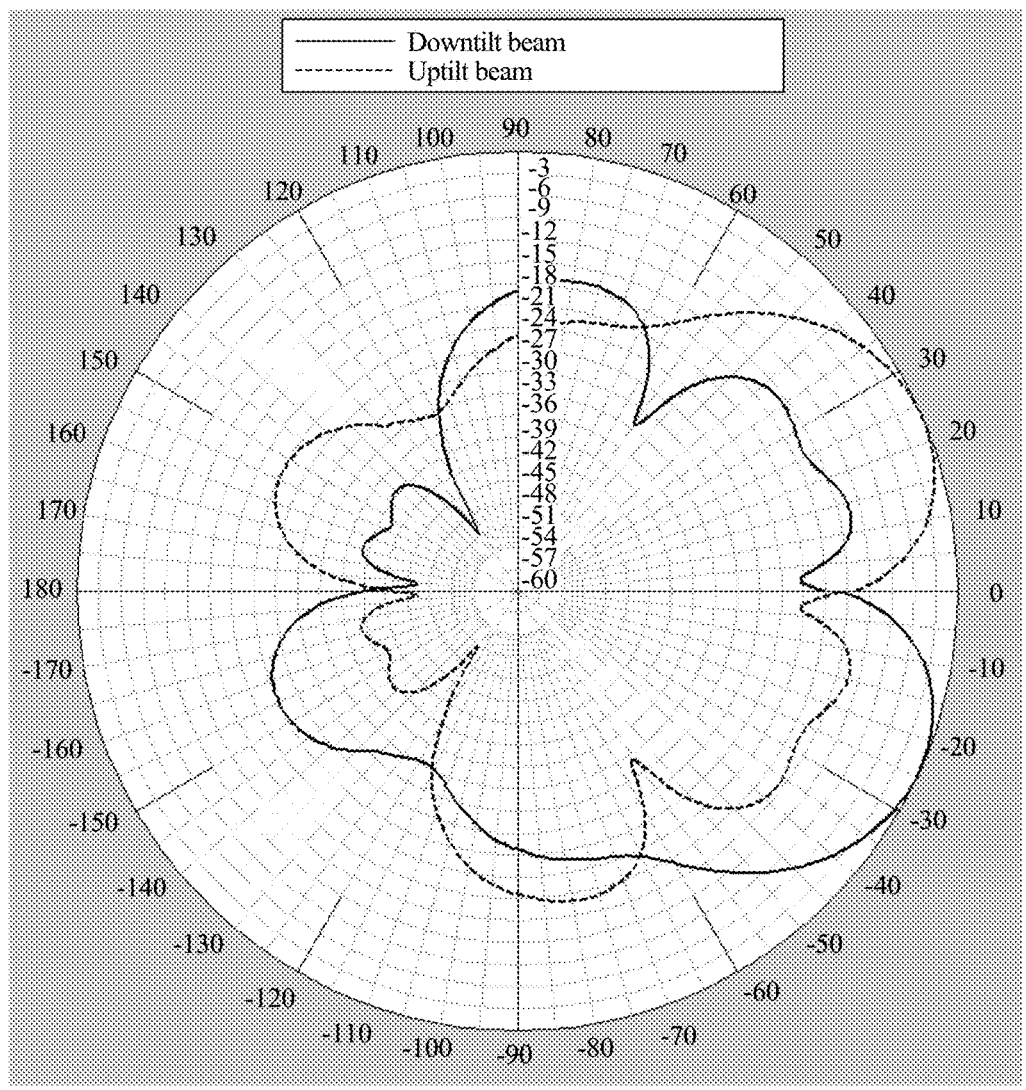
FIG. 5C is a diagram of a beam direction of a beam formed according to Embodiment 3 of the present invention.

An uptilt beam and a downtilt beam that are finally formed according to the antenna system in Embodiment 3 are shown in FIG. 5C. The uptilt beam has a vertical beam width of 25 degrees, a gain of 13.43 dBi, and an uptilt of 24 degrees, and can be responsible for covering a three-dimensional building region. The downtilt beam has a vertical beam width of 25 degrees, a gain of 13.43 dBi, and a downtilt of 24 degrees, and can be responsible for covering a ground region. In Embodiment 3, both interference on a main lobe of the downtilt beam caused by the uptilt beam and interference on a main lobe of the uptilt beam caused by the downtilt beam can be controlled at around 14 dB, and an overlap between the uptilt beam and the downtilt beam is about 15 dB. Compared with Embodiment 1, it can be learned that element spacings between elements in three array groups in an antenna module 110 may be different, and it can also be learned that a beam angle of a beam finally formed in an antenna can be changed by changing the element spacing between the elements in the antenna module 110 in the antenna system. Therefore, controlling a position of a region that can be covered by the antenna in a three-dimensional manner is implemented.

Embodiment 4

Figure 6A:
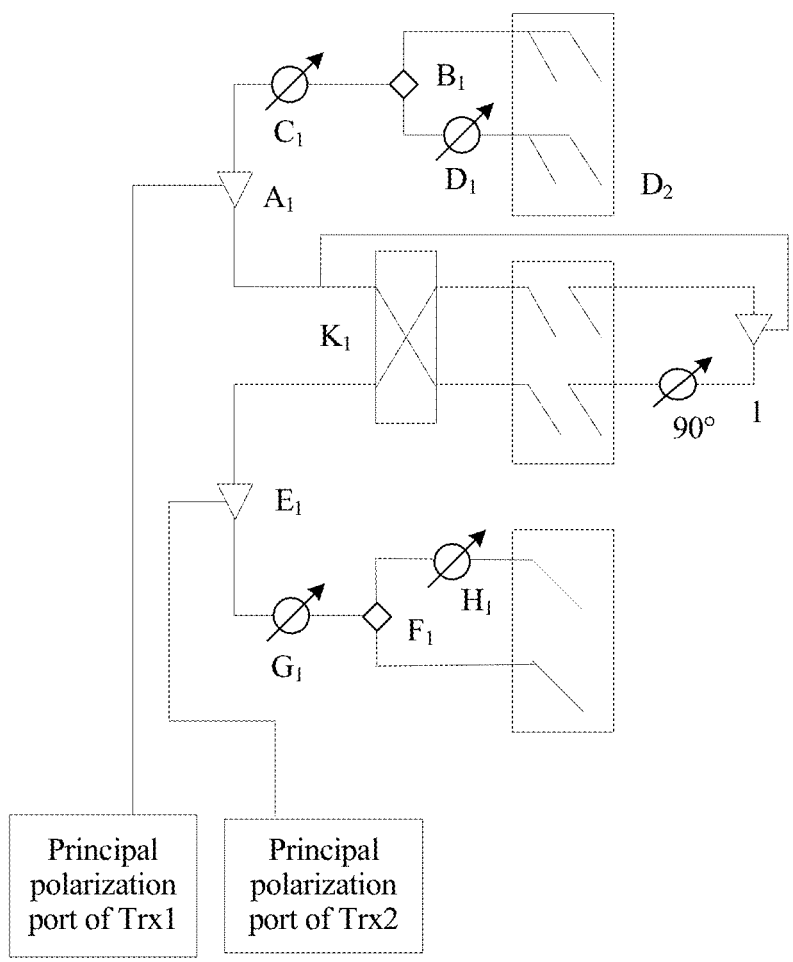
FIG. 6A is a diagram of an entity structure of a B-type preferred antenna system in another implementation manner according to an embodiment of the present invention.

For a structural diagram of an antenna system in Embodiment 4, reference is made to FIG. 6A (only one structural diagram of principal polarization is shown in FIG. 6A, and for a structure of negative polarization, reference may be made to FIG. 6A). However, compared with the foregoing Embodiment 1, some settings in Embodiment 4 are different from those in Embodiment 1. A specific difference is that both a third array 1103 and a shared array 1105 consist of 2*2 elements. Element spacing between two elements, a vertical element and a horizontal element, is a 0.6 wavelength. Because the shared array 1105 includes 2*2 elements in this embodiment, a power splitter $U_1$ with a power-split ratio of 1:1 and a phase shifter $V_1$ with a phase-shift angle of 90 degrees shown in FIG. 6A are accordingly added, and a power splitter (not shown in the figure) and a phase shifter (not shown in the figure) that are connected to a negative polarization port are added. For other parameters, reference is still made to the description in Embodiment 1.

Figures 1, 6B:
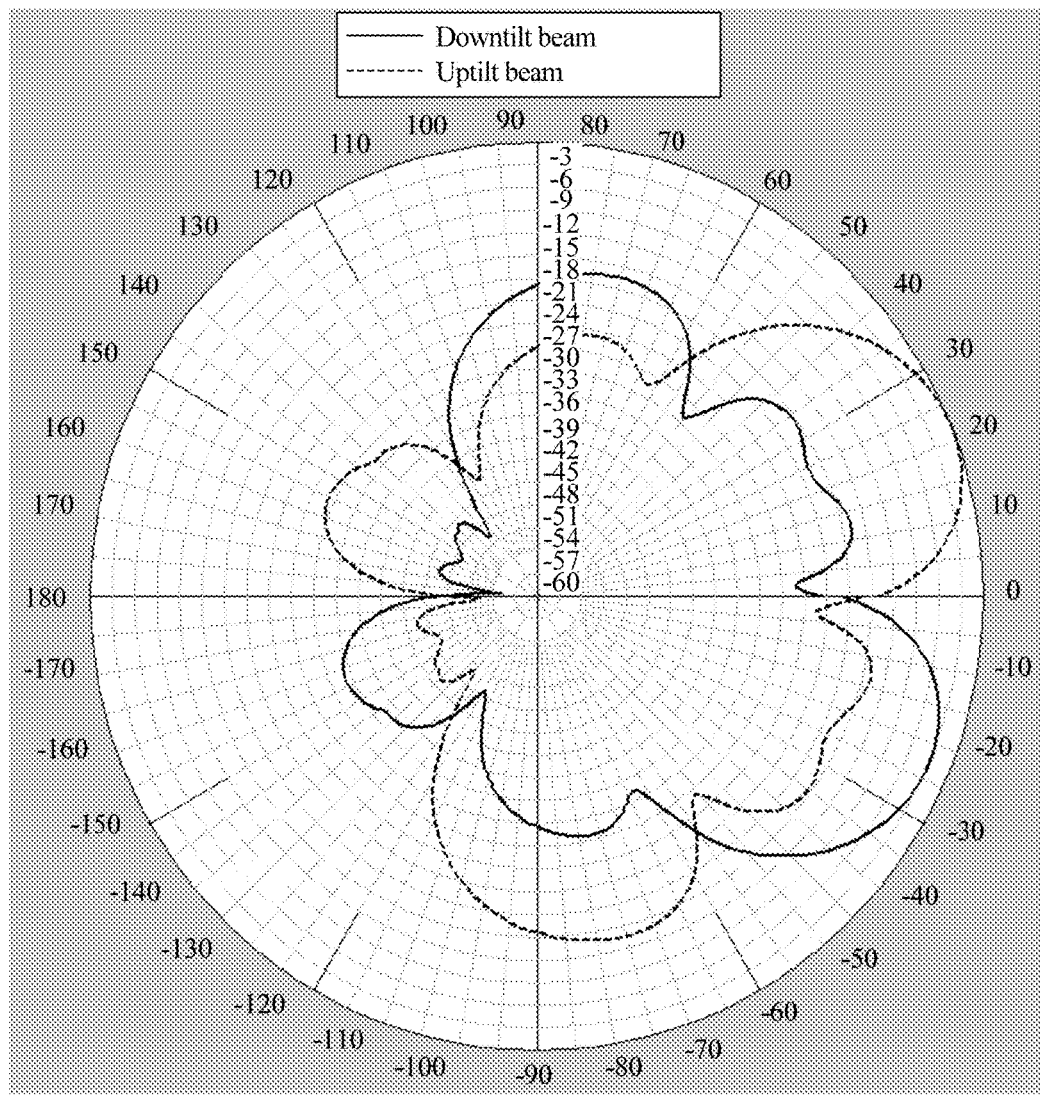
Figures 2, 6B:
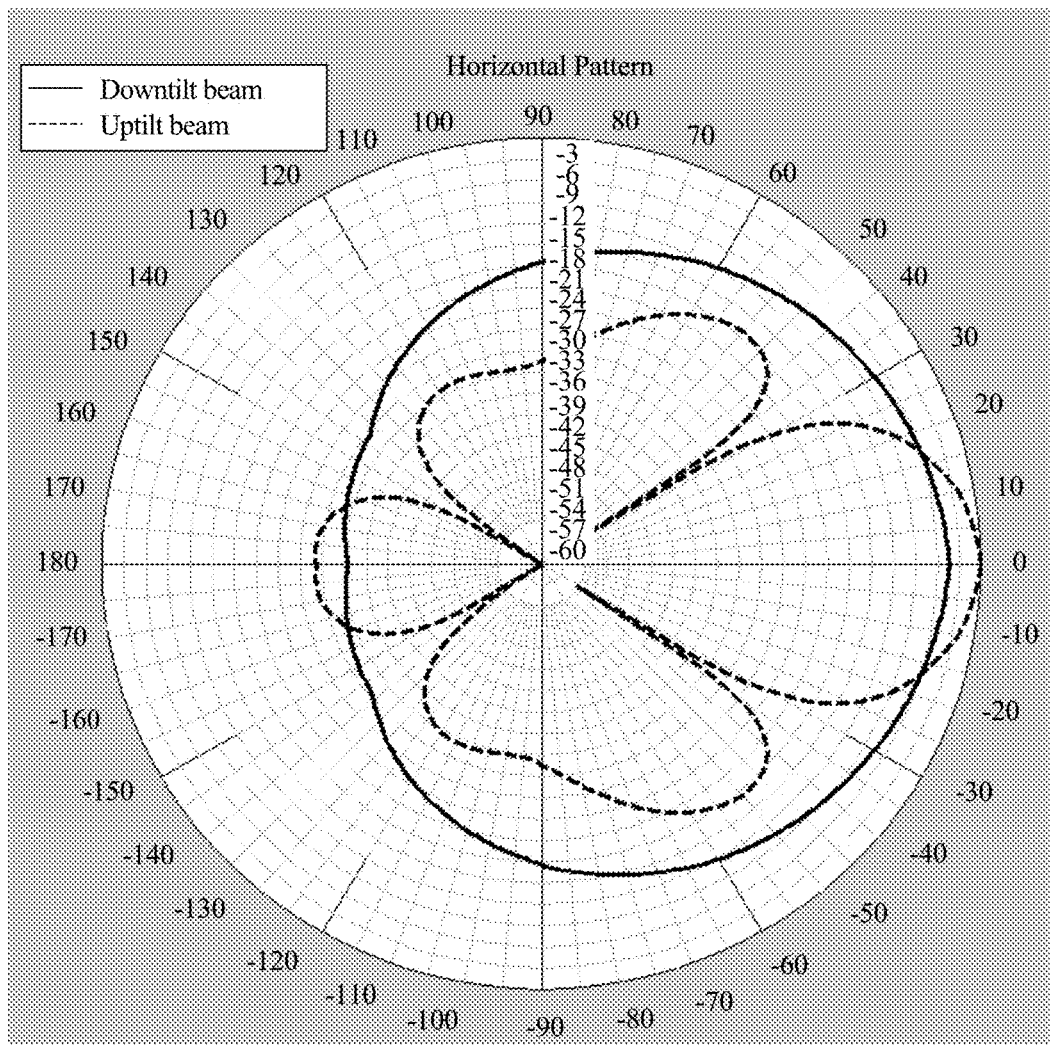

An uptilt beam and a downtilt beam that are finally formed according to the antenna system in Embodiment 4 are shown in FIG. 6B-1 and FIG. 6B-2. The uptilt beam has a horizontal beam width of 34 degrees, a vertical beam width of 25 degrees, a gain of 16.08 dBi, and an uptilt of 23 degrees, and can be responsible for covering a three-dimensional building region. The downtilt beam has a horizontal beam width of 58 degrees, a vertical beam width of 25 degrees, a gain of 13.60 dBi, and a downtilt of 23 degrees, and is responsible for covering a key ground region. In Embodiment 4, both interference on a main lobe of the downtilt beam caused by the uptilt beam and interference on a main lobe of the uptilt beam caused by the downtilt beam can be controlled at around 14 dB, and an overlap between the uptilt beam and the downtilt beam is about 15 dB. Compared with Embodiment 1, it can be learned that, three array groups in an antenna module 110 may include a single-column element or a multi-column element. In practical application, some multi-column elements in multi-column elements may be used, so that a horizontal beam width finally formed in an antenna can be changed. Therefore, adjusting a size of a region that can be covered by the antenna in a three-dimensional manner is implemented. A relatively wide beam is used for the downtilt beam in the antenna system in Embodiment 4, so that services in a large ground region can be absorbed; and beam width adjustment can be implemented for the uptilt beam by using some columns in the multi-column elements. In this way, power can be fully used, and unnecessary interference is also avoided.

Figure 7A:
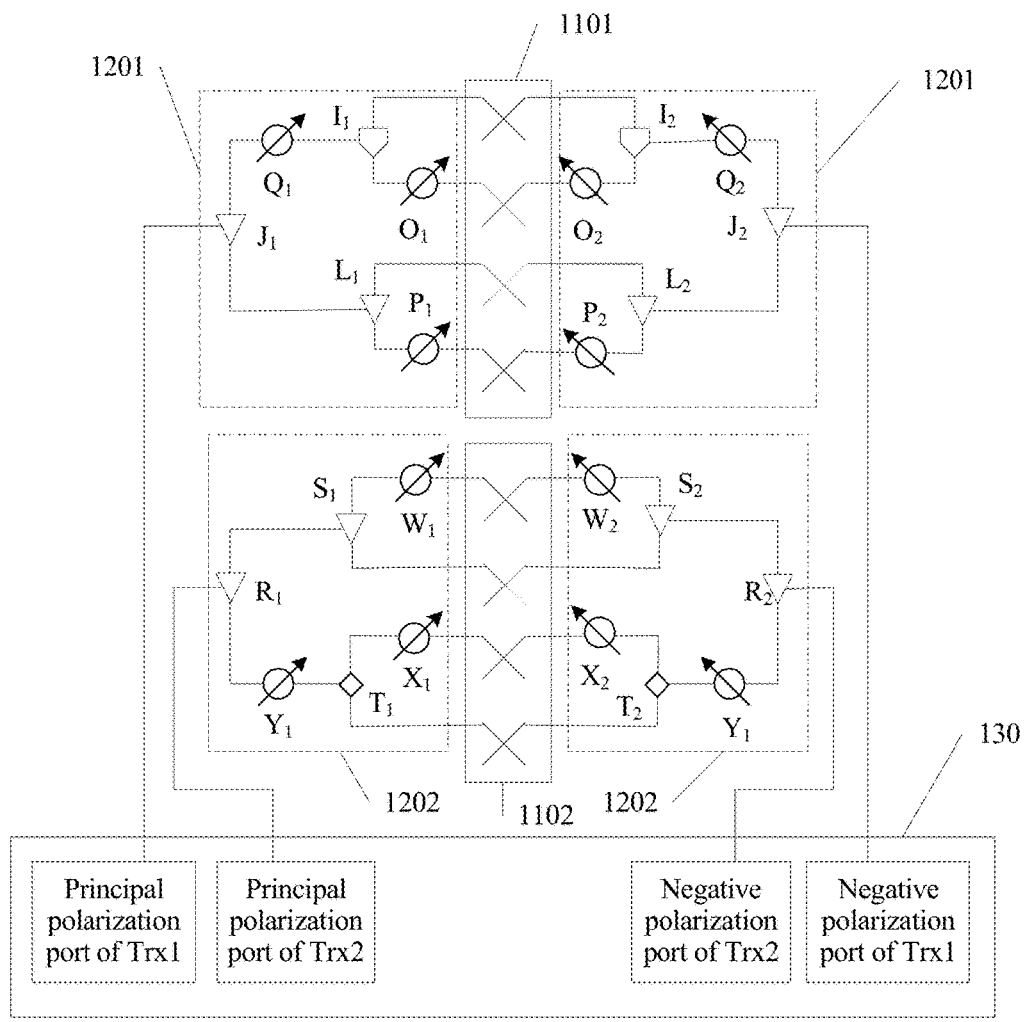
FIG. 7A is a diagram of an entity structure of an A-type preferred antenna system in an implementation manner according to an embodiment of the present invention.
Figure 7B:
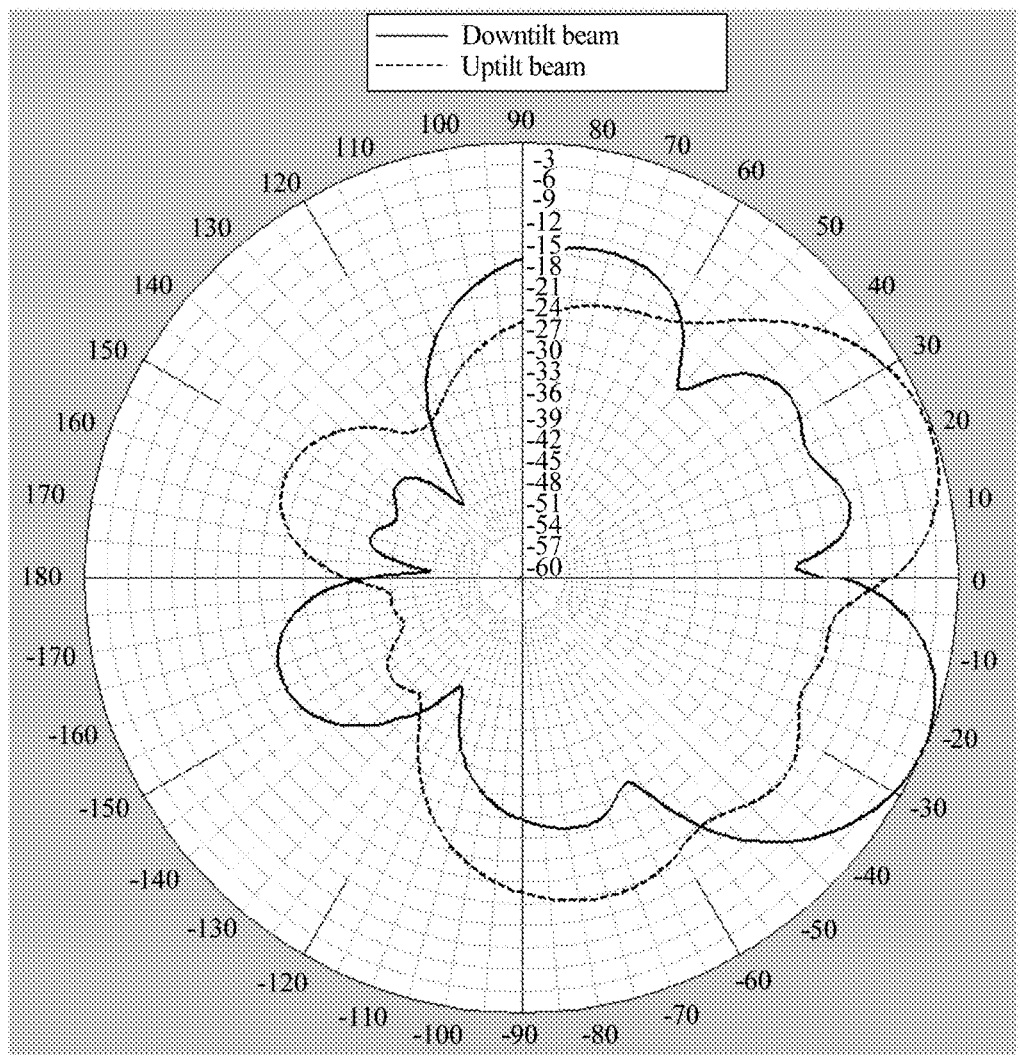
FIG. 7B is a diagram of a beam direction of a beam formed according to Embodiment 5 of the present invention.

The following describes an A-type preferred antenna system according to an embodiment of the present invention by using an example and with reference to FIG. 7A and FIG. 7B.

Embodiment 5

As shown in FIG. 7A, in this embodiment, elements in a first array 1101 and a second array 1102 in an antenna module 110 are all single polarization elements, each of the two array groups includes 1*4 elements, and element spacings between all the elements in the two array groups are a 0.6 wavelength.

A radio frequency transceiving module 130 in this embodiment is the same as the radio frequency transceiving module 130 in the foregoing Embodiment 1 to Embodiment 4, and includes a transceiver Trx1 configured to generate a third radio frequency signal, and a transceiver Trx2 configured to generate a fourth radio frequency signal. Both the transceiver Trx1 and the transceiver Trx2 have two cross polarization ports (a principal polarization port and a negative polarization port).

Because elements in the two array groups are all dual-polarized elements, two first uptilt power-split phase-shift network modules 1201 are set to be connected to the first array 1101, and two first downtilt power-split phase-shift network modules 1202 are set to be connected to the second array 1102.

A first uptilt power-split phase-shift network module 1201 connected to the principal polarization port of the Trx1 includes a power splitter $I_1$ with a power-split ratio of 1:5, a power splitter $J_1$ and a power splitter $L_1$ with a power-split ratio of 1:1, a phase shifter $O_1$ and a phase shifter $P_1$ with a phase-shift angle of 90degrees, and a phase shifter $Q_1$ with a phase-shift angle of 195 degrees. A first downtilt power-split phase-shift network module 1202 connected to the principal polarization port of the Trx2 includes a power splitter $R_1$ and a power splitter $S_1$ with a power-split ratio of 1:1, a power splitter $T_1$ with a power-split ratio of 1:4, a phase shifter $W_1$ and a phase shifter $X_1$ with a phase-shift angle of 90 degrees, and a phase shifter $Y_1$ with a phase-shift angle of 195 degrees. In this embodiment, an uptilt power-split phase-shift network module connected to the negative polarization port of the Trx1 has a same structure as the foregoing first uptilt power-split phase-shift network module 1201 connected to the principal polarization port of the Trx1. A downtilt power-split phase-shift network module connected to the negative polarization port of the Trx2 has a same structure as the foregoing first downtilt power-split phase-shift network module 1202 connected to the principal polarization port of the Trx2. Reference is made to FIG. 7A for details, which are not described herein again for brevity of the specification.

Directions of an uptilt beam and a downtilt beam that are finally formed according to an antenna system in this embodiment are shown in FIG. 7B. The formed uptilt beam has a vertical beam width of 26 degrees, a gain of 13.12 dBi, and an uptilt of 21 degrees, and can be responsible for covering a three-dimensional building region. The formed downtilt beam has a vertical beam width of 25 degrees, a gain of 13.60 dBi, and a downtilt of 23 degrees, and can be responsible for covering a key ground region. In Embodiment 5, both interference on a main lobe of the downtilt beam caused by the uptilt beam and interference on a main lobe of the uptilt beam caused by the downtilt beam can be controlled at around 15.8 dB, and an overlap between the uptilt beam and the downtilt beam is about 12 dB. It can be learned from any implementation manner of the foregoing Embodiment 1 to Embodiment 5 that 3-dimensional coverage can also be implemented without using a shared antenna element in an antenna system.

In conclusion, it can be learned from the foregoing descriptions from Embodiment 1 to Embodiment 5 that there is no need to deploy multiple antennas to implement 3-dimensional coverage in the antenna system disclosed in the present invention, thereby facilitating deployment. In addition, a component parameter, a quantity of elements, and/or an element spacing between elements in the antenna system may be configured according to a requirement. Therefore, the antenna system provided in the present invention has relatively good service adaptability. Because an antenna module in the antenna system in Embodiment 1 to Embodiment 4 shares an antenna element, a volume of an antenna and costs are further reduced.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An antenna system, comprising:
an antenna module, configured to: receive and/or transmit at least one first radio frequency signal, and receive and/or transmit at least one second radio frequency signal; and
a power-split phase-shift network module, configured to control an amplitude and a phase of each radio frequency signal in the antenna module, wherein control parameters for controlling an amplitude and a phase of each first radio frequency signal are configured according to a beam pointing direction and a beam width that are required by a three-dimensional building region, and control parameters for controlling an amplitude and a phase of each second radio frequency signal are configured according to a beam pointing direction and a beam width that are required by a ground region.

2. The antenna system according to claim 1, wherein the antenna system further comprises:
a radio frequency transceiving module, configured to: provide, after processing a baseband signal to obtain a third radio frequency signal and a fourth radio frequency signal, the third radio frequency signal and the fourth radio frequency signal for the power-split phase-shift network module, and process the at least one first radio frequency signal and the at least one second radio frequency signal received from the power-split phase-shift network module, to obtain the baseband signal.

3. The antenna system according to claim 2, wherein the antenna module comprises a first array and a second array;
M first radio frequency signals function on $M_1*N_1$ elements in the first array, to form an uptilt beam covering the three-dimensional building region, wherein a value of M corresponds to a quantity of elements comprised in the first array, $M_1$ represents a quantity of horizontal elements in the first array, $N_1$ represents a quantity of vertical elements in the first array, M and $M_1$ are positive integers, and $N_1$ is an integer greater than 1; and
N second radio frequency signals function on $M_2*N_2$ elements in the second array, to form a downtilt beam covering the ground region, wherein a value of N corresponds to a quantity of elements comprised in the second array, $M_2$ represents a quantity of horizontal elements in the second array, $N_2$ represents a quantity of vertical elements in the second array, N and $M_2$ are positive integers, and $N_2$ is an integer greater than 1.

4. The antenna system according to claim 3, wherein the power-split phase-shift network module comprises:
a first uptilt power-split phase-shift network module, configured to perform power splitting and phase change on the third radio frequency signal, so as to split the third radio frequency signal into the M first radio frequency signals; and
a first downtilt power-split phase-shift network module, configured to perform power splitting and phase change on the fourth radio frequency signal, so as to split the fourth radio frequency signal into the N second radio frequency signals.

5. The antenna system according to claim 4, wherein the first uptilt power-split phase-shift network module comprises at least one phase shifter and at least one power splitter, and the first downtilt power-split phase-shift network module comprises at least one phase shifter and at least one power splitter, wherein
each phase shifter is connected to each power splitter, each power splitter is configured to perform power splitting on a radio frequency signal that passes through the power splitter, and each phase shifter is configured to perform phase shift on a radio frequency signal that passes through the phase shifter, a power-split ratio of each power splitter and a phase-shift angle of each phase shifter are configured according to the three-dimensional building region or the ground region that a beam needs to cover.

6. The antenna system according to claim 2, wherein the antenna module comprises a third array, a fourth array, and a shared array; and
P first radio frequency signals function on $M_3*N_3$ elements in the third array, to form a first uptilt sub-beam, wherein a value of P corresponds to a quantity of elements comprised in the third array, $M_3$ represents a quantity of horizontal elements in the third array, $N_3$ represents a quantity of vertical elements in the third array, P and $M_3$ are positive integers, and $N_3$ is an integer greater than 1;
Q second radio frequency signals function on $M_4*N_4$ elements in the fourth array, to form a first downtilt sub-beam, wherein a value of Q corresponds to a quantity of elements comprised in the fourth array, $M_4$ represents a quantity of horizontal elements in the fourth array, $N_4$ represents a quantity of vertical elements in the fourth array, Q and $M_4$ are positive integers, and $N_4$ is an integer greater than 1;
K first radio frequency signals and K second radio frequency signals function on $M_5*N_5$ elements in the shared array, to form a second uptilt sub-beam corresponding to the K first radio frequency signals and a second downtilt sub-beam corresponding to the K second radio frequency signals, wherein a value of K corresponds to a quantity of elements comprised in the shared array, $M_5$ represents a quantity of horizontal elements in the shared array, $N_5$ represents a quantity of vertical elements in the shared array, K and $M_5$ are positive integers, and $N_5$ is an integer greater than 1; and
the first uptilt sub-beam and the second uptilt sub-beam jointly form an uptilt beam covering the three-dimensional building region, and the first downtilt sub-beam and the second downtilt sub-beam jointly form a downtilt beam covering the ground region.

7. The antenna system according to claim 6, wherein the power-split phase-shift network module comprises:
   a second uptilt power-split phase-shift network module, configured to perform power splitting and phase change on the third radio frequency signal, so as to split the third radio frequency signal into the P first radio frequency signals; and
   a second downtilt power-split phase-shift network module, configured to perform power splitting and phase change on the fourth radio frequency signal, so as to split the fourth radio frequency signal into the Q second radio frequency signals; and
   an uptilt-downtilt power-split phase-shift network module, configured to: perform power splitting and phase change on the third radio frequency signal, so as to split the third radio frequency signal into the K first radio frequency signals; and perform power splitting and phase change on the fourth radio frequency signal, so as to split the fourth radio frequency signal into the K second radio frequency signal.

8. The antenna system according to claim 7, wherein the uptilt-downtilt power-split phase-shift network module comprises one or more bridges, and each bridge is configured to: perform split and combination processing on the third radio frequency signal and the fourth radio frequency signal, and perform power splitting on a radio frequency signal obtained after the split and combination processing.

9. The antenna system according to claim 7, wherein the second uptilt power-split phase-shift network module comprises at least one phase shifter and at least one power splitter, and the second downtilt power-split phase-shift network module comprises at least one phase shifter and at least one power splitter, wherein
   each phase shifter is connected to each power splitter, each power splitter is configured to perform power splitting on a radio frequency signal that passes through the power splitter, and each phase shifter is configured to perform phase shift on a radio frequency signal that passes through the phase shifter, a power-split ratio of each power splitter and a phase-shift angle of each phase shifter are configured according to a beam pointing direction and a beam width.

10. The antenna system according to claim 1, wherein an element comprised in the antenna module is a single-polarized element or a dual-polarized element.

* * * * *

UNITED STATES PATENT AND TRADEMARK OFFICE
CERTIFICATE OF CORRECTION

PATENT NO. : 10,205,236 B2  
APPLICATION NO. : 15/349380  
DATED : February 12, 2019  
INVENTOR(S) : Xiaohui Ma et al.

Page 1 of 1

It is certified that error appears in the above-identified patent and that said Letters Patent is hereby corrected as shown below:

In the Claims

Column 16, Line 51 (approx.):
In Claim 6, delete "$M_5 *N_5 elements$" and insert -- $M_5*N_5$ elements --, therefor.

Signed and Sealed this  
Fifteenth Day of October, 2019

Andrei Iancu  
*Director of the United States Patent and Trademark Office*